(12) United States Patent
Coupar et al.

(10) Patent No.: US 11,626,636 B2
(45) Date of Patent: Apr. 11, 2023

(54) IMMERSION COOLING BATTERY ARRAY DESIGNS FOR ELECTRIFIED VEHICLE BATTERY PACKS

(71) Applicant: FORD GLOBAL TECHNOLOGIES, LLC, Dearborn, MI (US)

(72) Inventors: Thomas J. Coupar, Ann Arbor, MI (US); James George Gebbie, Rochester Hills, MI (US); Hao Wu, Northville, MI (US); Holly Marie Gilbert, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 203 days.

(21) Appl. No.: 16/987,482

(22) Filed: Aug. 7, 2020

(65) Prior Publication Data
US 2022/0045388 A1    Feb. 10, 2022

(51) Int. Cl.
*H01M 10/6567* (2014.01)
*H01M 10/613* (2014.01)
*H01M 10/625* (2014.01)
*H01M 50/20* (2021.01)
*H01M 50/40* (2021.01)

(52) U.S. Cl.
CPC ..... *H01M 10/6567* (2015.04); *H01M 10/613* (2015.04); *H01M 10/625* (2015.04); *H01M 50/20* (2021.01); *H01M 50/40* (2021.01); *H01M 2220/20* (2013.01)

(58) Field of Classification Search
CPC ................................................ H01M 10/6567
See application file for complete search history.

(56) References Cited

U.S. PATENT DOCUMENTS

| | | | |
|---|---|---|---|
| 10,193,181 B2 | 1/2019 | Niwa et al. | |
| 10,547,091 B2 | 1/2020 | Tajima et al. | |
| 2011/0135985 A1* | 6/2011 | Kim | H01M 10/647 429/247 |
| 2011/0183177 A1* | 7/2011 | Sohn | H01M 50/20 429/120 |
| 2017/0125858 A1* | 5/2017 | Miller | H01M 10/625 |
| 2017/0214013 A1* | 7/2017 | Benedict | H01M 50/264 |

FOREIGN PATENT DOCUMENTS

| | | |
|---|---|---|
| WO | 2010016771 A1 | 2/2010 |
| WO | 2017193880 A1 | 11/2017 |

OTHER PUBLICATIONS

Enclosed (Year: 2022).*

* cited by examiner

*Primary Examiner* — Brian R Ohara
(74) *Attorney, Agent, or Firm* — David B. Kelley; Carlson, Gaskey & Olds P.C.

(57) ABSTRACT

This disclosure details exemplary immersion cooling battery array designs for use in electrified vehicle battery packs or other electrified components. An exemplary battery array design may include a battery subassembly including a compressible spacer assembly and a plurality of battery cells held by the compressible spacer assembly. The battery subassembly may be surrounded by an outer shell assembly. A non-conductive (i.e., dielectric) fluid may be received and communicated inside the outer shell assembly for thermally managing heat generated by the battery cells.

2 Claims, 6 Drawing Sheets

IMMERSION COOLING BATTERY ARRAY DESIGNS FOR ELECTRIFIED VEHICLE BATTERY PACKS

TECHNICAL FIELD

This disclosure relates generally to battery packs, and more particularly to battery packs with immersion cooled battery arrays.

BACKGROUND

There is a desire to reduce automotive fuel consumption and emissions. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of battery cells that store energy for powering the electrical loads. The battery cells generate heat during charging and discharging operations. This heat must be dissipated in order to achieve a desired level of battery performance. Heat exchanger plates, sometimes referred to as "cold plates," are often employed to dissipate the heat generated by the battery cells.

SUMMARY

A battery array according to an exemplary aspect of the present disclosure includes, among other things, a first compressible spacer plate, a second compressible spacer plate, a battery cell received between the first and second compressible spacer plates to establish a battery subassembly, and an outer shell assembly enclosing the battery subassembly.

In a further non-limiting embodiment of the foregoing battery array, the battery cell is received within a first groove of the first compressible spacer plate and a second groove of the second compressible spacer plate.

In a further non-limiting embodiment of either of the foregoing battery arrays, each of the first compressible spacer plate and the second compressible spacer plate is movable between an uncompressed state and a compressed state relative to the battery cell.

In a further non-limiting embodiment of any of the foregoing battery arrays, a column that extends between the first and second compressible spacer plates is spaced apart from the battery cell in the uncompressed state and is positioned against the battery cell in the compressed state.

In a further non-limiting embodiment of any of the foregoing battery arrays, at least one of the first compressible spacer plate, the second compressible spacer plate, and the column includes a lattice structure having a plurality of interconnected passageways.

In a further non-limiting embodiment of any of the foregoing battery arrays, the outer shell assembly includes a first shell portion and a second shell portion that are connected together to enclose the battery subassembly inside the outer shell assembly.

In a further non-limiting embodiment of any of the foregoing battery arrays, a seal is disposed between a flange of the first shell portion and an inner surface of the second shell portion.

In a further non-limiting embodiment of any of the foregoing battery arrays, an immersion cooling system includes an inlet, an outlet, at least one open space, and at least one integrated fluid passage.

In a further non-limiting embodiment of any of the foregoing battery arrays, a non-conductive fluid is received inside the battery array through the inlet and expelled from the battery array through the outlet.

In a further non-limiting embodiment of any of the foregoing battery arrays, the at least one integrated fluid passage extends between a first column that extends between the first and second compressible spacer plates and a second column that extends between a third compressible spacer plate and a fourth compressible spacer plate.

A battery pack according to another exemplary aspect of the present disclosure includes, among other things, an enclosure assembly and a battery array housed inside the enclosure assembly. The battery array includes a battery subassembly, an outer shell assembly surrounding the battery subassembly, and a non-conductive fluid contained within the outer shell assembly and configured to immersion cool the battery subassembly.

In a further non-limiting embodiment of the foregoing battery pack, the battery subassembly includes a compressible spacer assembly and a plurality of battery cells held by the compressible spacer assembly.

In a further non-limiting embodiment of either of the foregoing battery packs, the compressible spacer assembly includes a first compressible spacer plate, a second compressible spacer plate, and at least two columns that connect between the first and second compressible spacer plates.

In a further non-limiting embodiment of any of the foregoing battery packs, the outer shell assembly includes a first shell portion and a second shell portion that are connected together to enclose the battery subassembly inside the outer shell assembly.

In a further non-limiting embodiment of any of the foregoing battery packs, an inlet is configured to receive the non-conductive fluid within an interior of the battery array and an outlet is configured to expel the non-conductive fluid from the interior.

In a further non-limiting embodiment of any of the foregoing battery packs, an open space is between the outer shell assembly and the battery subassembly. The open space is in fluid communication with the inlet. An integrated flow path is in fluid communication with the open space.

In a further non-limiting embodiment of any of the foregoing battery packs, the inlet, the open space, and the integrated flow path establish a fluid flow pattern for communicating the non-conductive fluid through the interior of the battery array.

In a further non-limiting embodiment of any of the foregoing battery packs, the fluid flow pattern extends across a face of a battery cell of the battery subassembly.

In a further non-limiting embodiment of any of the foregoing battery packs, a compressible spacer assembly of the battery subassembly is movable between an uncompressed state and a compressed state relative to a battery cell of the battery subassembly.

In a further non-limiting embodiment of any of the foregoing battery packs, the non-conductive fluid is a non-flammable dielectric fluid.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are somehow incompatible.

The various features and advantages of this disclosure will become apparent to those skilled in the art from the following detailed description. The drawings that accompany the detailed description can be briefly described as follows.

DETAILED DESCRIPTION

This disclosure details exemplary immersion cooling battery array designs for use in electrified vehicle battery packs or other electrified components. An exemplary battery array design may include a battery subassembly including a compressible spacer assembly and a plurality of battery cells held by the compressible spacer assembly. The battery subassembly may be surrounded by an outer shell assembly. A non-conductive (i.e., dielectric) fluid may be received and communicated inside the outer shell assembly for thermally managing heat generated by the battery cells. These and other features are discussed in greater detail in the following paragraphs of this detailed description.

Figure 1:
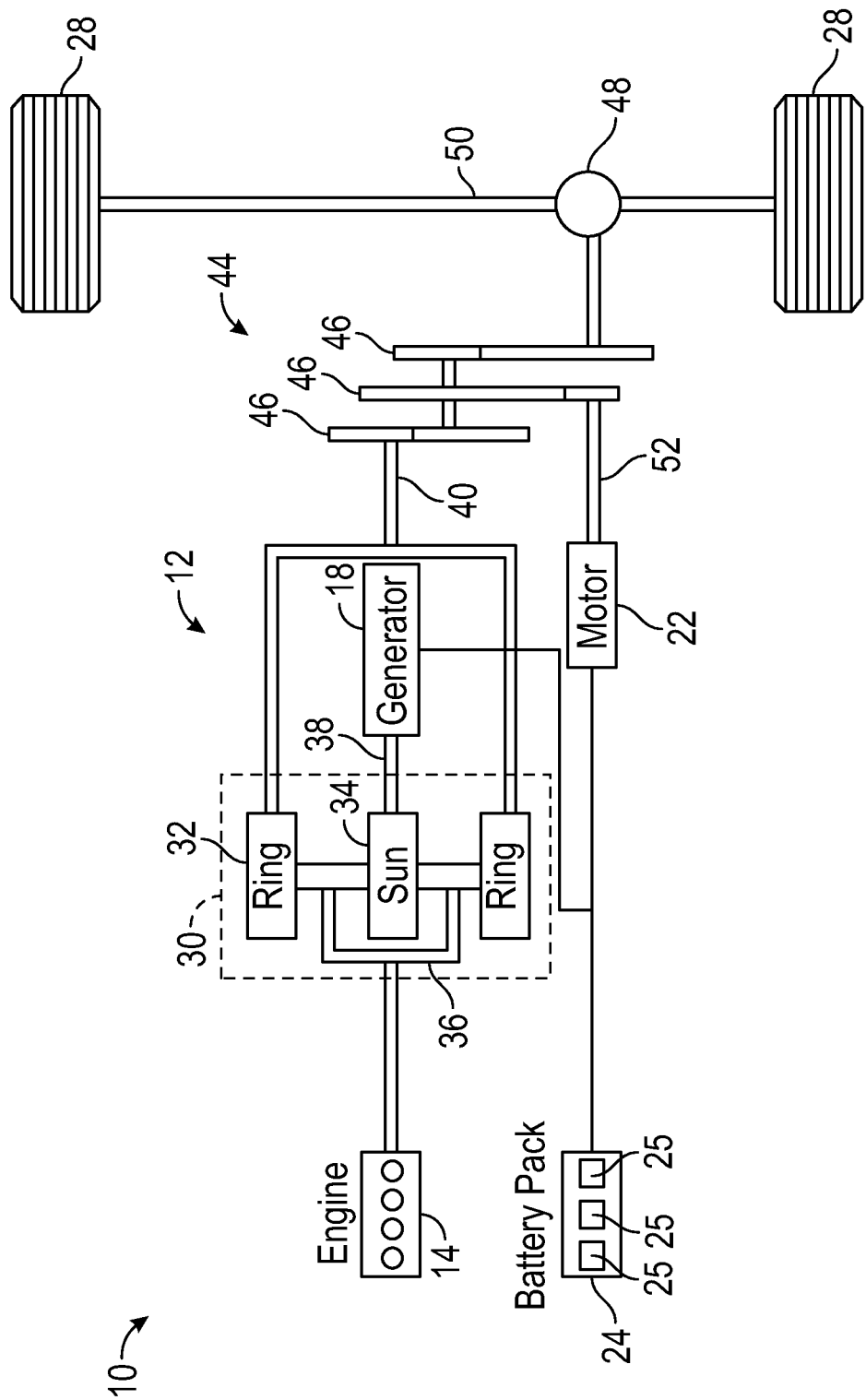
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system may include a combination of an engine 14 and a generator 18 (i.e., a first electric machine). The second drive system may include at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including but not limited to full hybrids, parallel hybrids, series hybrids, mild hybrids, micro hybrids, fuel cell vehicles, etc.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In an embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which may be connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In an embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In an embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle traction battery. The battery pack 24 may be a high voltage traction battery that includes a plurality of battery arrays 25 (i.e., battery assemblies or groupings of battery cells) capable of both outputting electrical power to operate the motor 22 and/or other electrical loads of the electrified vehicle 12 and receiving power from the generator 18. Other types of energy storage devices and/or output devices could also be used to electrically power the electrified vehicle 12, including low voltage batteries.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
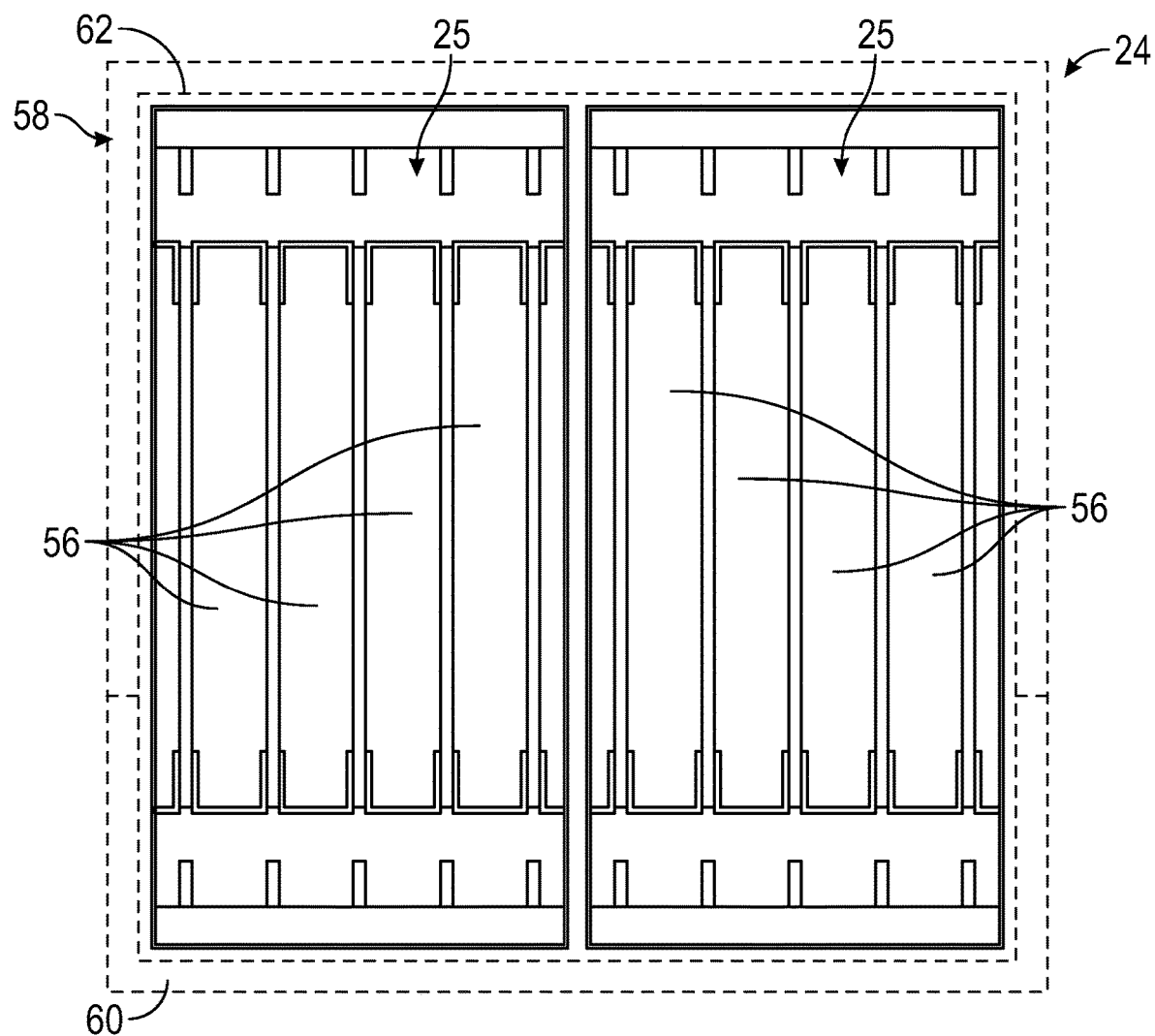
FIG. 2 illustrates an exemplary battery pack for an electrified vehicle.

FIG. 2 schematically illustrates a battery pack 24 that can be employed within an electrified vehicle. For example, the battery pack 24 could be part of the powertrain 10 of the electrified vehicle 12 of FIG. 1 or any other electrified powertrain. Portions (e.g., an enclosure assembly 58) are shown in phantom in FIG. 2 to better illustrate the internal components of the battery pack 24.

The battery pack 24 houses a plurality of battery cells 56 that store energy for powering various electrical loads of the electrified vehicle 12. The battery pack 24 could employ any number of battery cells 56 within the scope of this disclosure. Thus, this disclosure is not limited to the exact configuration shown in FIG. 2.

The battery cells 56 may be stacked side-by-side to construct a grouping of battery cells 56, sometimes referred to as a "cell stack" or "cell array." In an embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as a battery array. The battery pack 24 of FIG. 2 includes two battery arrays 25. However, the battery pack 24 could include a greater or fewer number of battery arrays 25 within the scope of this disclosure. In an embodiment, battery arrays 25 are disposed laterally adjacent to one another. The battery arrays 25 of FIG. 2 are therefore positioned side-by-side relative to one another inside the battery pack 24. However, other configurations are also contemplated within the scope of this disclosure, including but not limited to embodiments in which the battery arrays 25 are stacked on top of one another, for example.

An enclosure assembly 58 houses each battery array 25 of the battery pack 24. The enclosure assembly 58 may be a sealed enclosure that includes a tray 60 and a cover 62 that is secured to the tray 60 to enclose and seal each battery array 25 of the battery pack 24. In an embodiment, the battery arrays 25 are positioned atop a floor of the tray 60 of the enclosure assembly 58, and the cover 62 may be received over the battery arrays 25 and then secured to the tray 60. The enclosure assembly 58 may include any size, shape, and configuration within the scope of this disclosure.

Heat may be generated and released by the battery cells 56 during charging operations, discharging operations, or other conditions. It is desirable to remove the generated heat to improve the life of the battery cells 56. Immersion cooled battery arrays are therefore contemplated within this disclosure. Exemplary battery arrays that incorporate immersion cooling systems are described in greater detail below.

Figure 3:
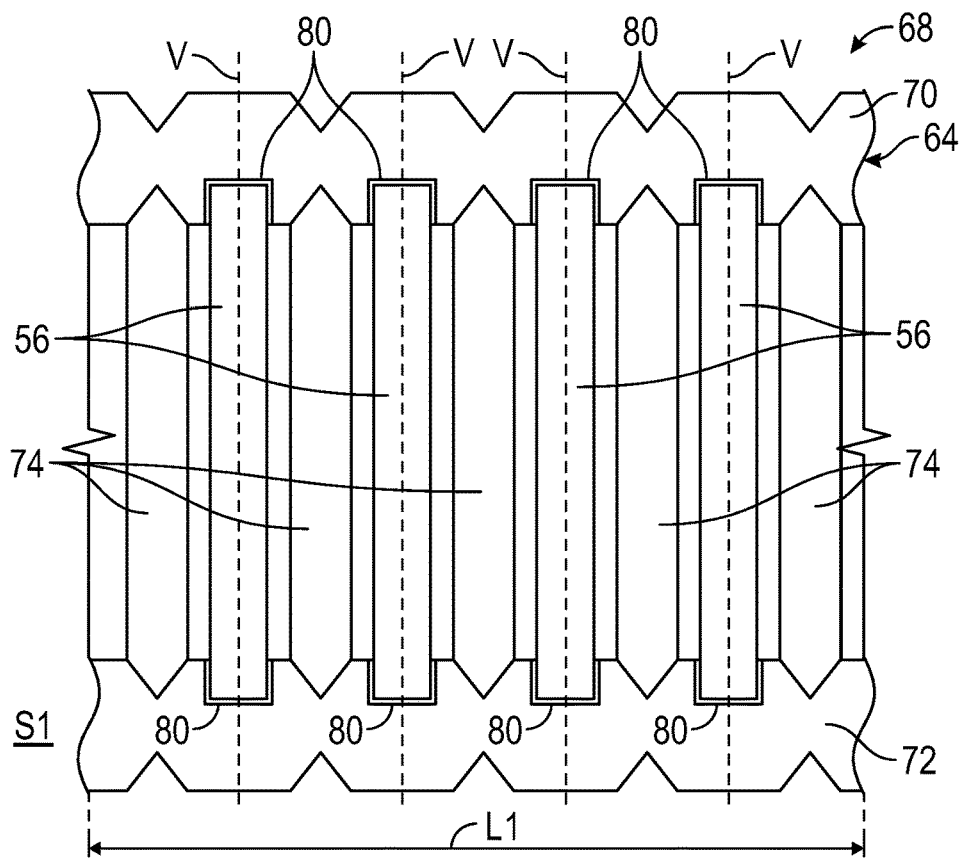
FIG. 3 illustrates a battery subassembly of a battery array.
Figure 4:
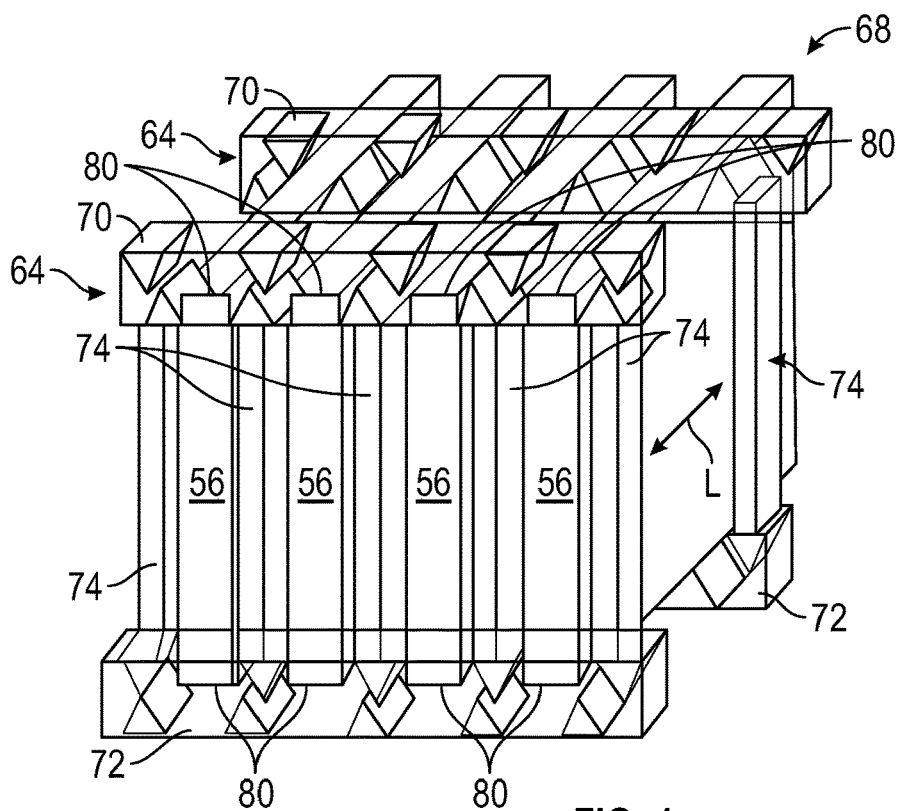
FIG. 4 is a perspective view of the battery subassembly of FIG. 3.
Figure 5:
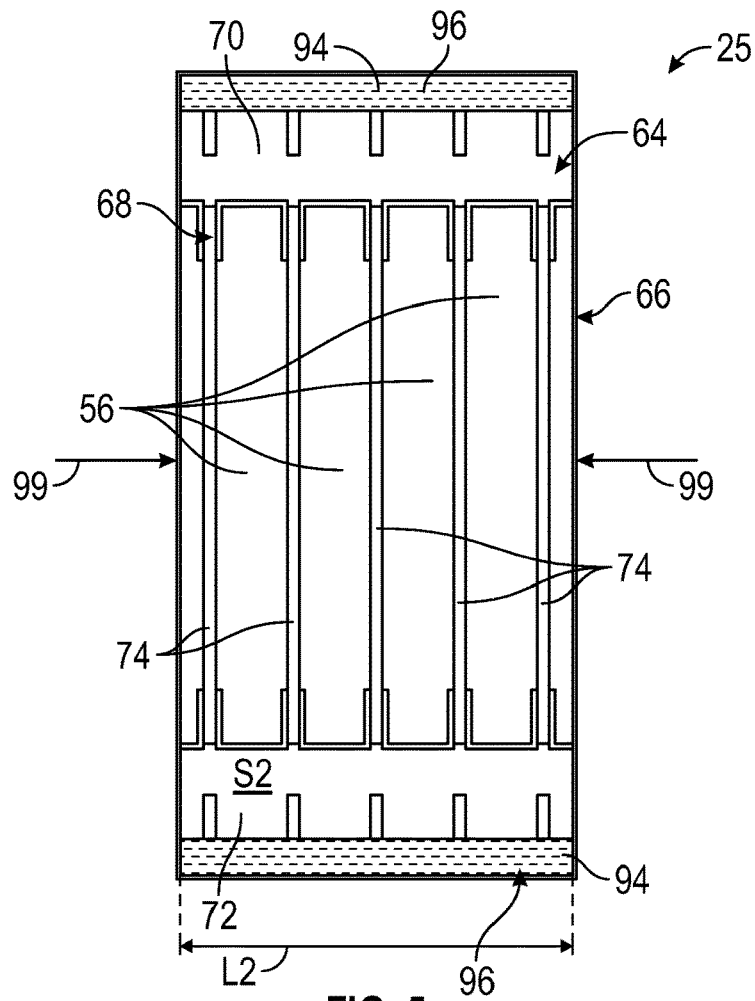
FIG. 5 illustrates a battery array that includes the battery subassembly of FIGS. 3 and 4.

FIGS. 3, 4, and 5 illustrate an exemplary immersion cooled battery array 25. The battery array 25 shown in FIGS. 3-5 is not necessarily drawn to scale, and some features may be exaggerated or minimized to emphasize certain details of a particular component.

The battery array 25 may include a compressible spacer assembly 64, a plurality of battery cells 56, and an outer shell assembly 66 (see FIG. 5). Together, the compressible spacer assembly 64 and the battery cells 56 establish a battery subassembly 68 (best shown in FIGS. 3 and 4) of the battery array 25. The battery subassembly 68 may be enclosed inside the outer shell assembly 66 to assemble the battery array 25 (see FIG. 5).

The compressible spacer assembly 64 may include a first compressible spacer plate 70, a second compressible spacer plate 72, and one or more columns 74 that extend between and connect the first and second compressible spacers plates 70, 72. Together, the first compressible spacer plate 70, the second compressible spacer plate 72, and the columns 74 may establish a monolithic structure of the compressible spacer assembly 64. When positioned within the outer shell assembly 66, the first compressible spacer plate 70 may be positioned relative to upper surfaces of the battery cells 56 and the second compressible spacer plate 72 may be positioned relative to lower surfaces of the battery cells 56. Accordingly, the first compressible spacer plate 70 may be referred to as an upper or top compressible spacer plate of the compressible spacer assembly 64, and the second compressible spacer plate 72 may be referred to as a lower or bottom compressible spacer plate of the compressible spacer assembly 64.

The compressible spacer assembly 64, including each of its constituent sections, may be made of any suitable polymer-based material. Exemplary polymer-based materials may include, but are not limited to, ethylene propylene diene monomers (EPDM). In an embodiment, the compressible spacer assembly 64 is an injection molded part. In another embodiment, the compressible spacer assembly 64 is an additively manufactured part. However, other manufacturing techniques and materials are also contemplated within the scope of this disclosure.

Figure 6:
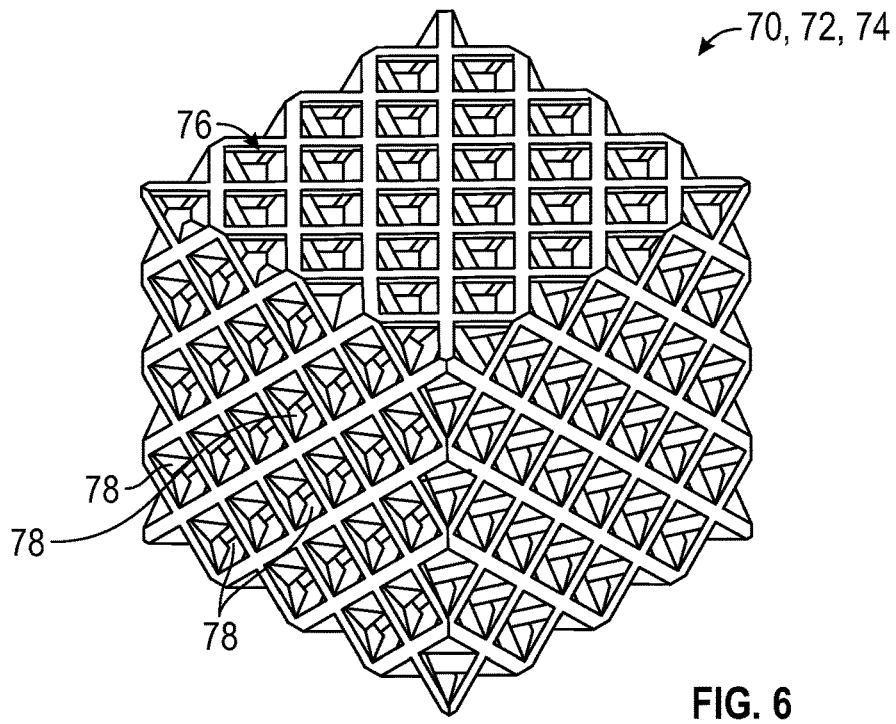
FIG. 6 illustrates an exemplary lattice structure of a portion of a compressible spacer assembly of a battery array.

In an embodiment, all or select portions of the first compressible spacer plate 70, the second compressible spacer plate 72, and/or the columns 74 may include a lattice structure 76 (see FIG. 6). The lattice structure 76 may define a plurality of interconnected passageways 78 or flow channels that allow a fluid, such as a non-conductive fluid, to pass through the lattice structure 76 for convectively cooling the battery cells 56.

The first and second compressible spacer plates 70, 72 may each embody an accordion-like structure that includes a plurality of grooves 80. In an embodiment, the grooves 80 are located axially between adjacent columns 74 of the compressible spacer assembly 64. Each groove 80 is configured to receive one of the battery cells 56. The grooves 80 of the first compressible spacer plate 70 may be aligned with corresponding grooves 80 of the second compressible spacer plate 72 along vertical axes V (see FIG. 3) to establish slots for receiving the battery cells 56. For example, the battery cells 56 can be inserted into the aligned grooves 80 of the first and second compressible spacer plates 70, 72, by sliding the battery cells 56 into the slots that extend between the grooves 80.

The first and second compressible spacers plates 70, 72 of the compressible spacer assembly 64 may be moved between an uncompressed state S1 (see FIG. 3) and a compressed state S2 (see FIG. 5). In the uncompressed state S1, the first and second compressible spacer plates 70, 72 include a first length L1 that is greater than a second length L2 of the first and second compressible spacer plates 70, 72 when in the compressed state S2. The columns 74 of the compressible spacer assembly 64 may be configured to act as integrated compression plates for compressing the battery cells 56 to the compressed state S2 and for improving the durability of the battery cells 56.

As best shown in FIG. 4, multiple (i.e., two or more) compressible spacer assemblies 64 may be employed within the battery subassembly 68 of the battery array 25. In an embodiment, the compressible spacer assemblies 64 are spaced apart from one another and positioned along a lengthwise direction L of the battery cells 56. The total number of compressible spacer assemblies 64 provided within the battery subassembly 68 is not intended to limit this disclosure.

As best shown in FIG. 5, the battery subassembly 68 may be positioned within the outer shell assembly 66 and then compressed (via compression forces 99) to the compressed state S2 to assemble the battery array 25. The outer shell assembly 66 may be a multi-piece, sealed structure for housing the battery subassembly 68 therein.

The battery subassembly 68 may be arranged inside the outer shell assembly 66 for establishing open spaces 94 above and below the battery subassembly 68. As further detailed below, a non-conductive fluid 96 (shown schematically) may be communicated into and out of the battery array 25, via the open spaces 94, for thermally managing heat generated by the battery cells 56. The non-conductive fluid 96 may be a dielectric fluid designed for immersion cooling the battery cells 56. One suitable non-conductive fluid is a Novek™ engineered fluid sold by 3M™. However, other non-conductive fluids may also be suitable, and the actual chemical make-up and design characteristics (e.g., dielectric constant, maximum breakdown strength, boiling point, etc.) may vary depending on the environment the battery array 25 is to be employed within.

Figure 8B:
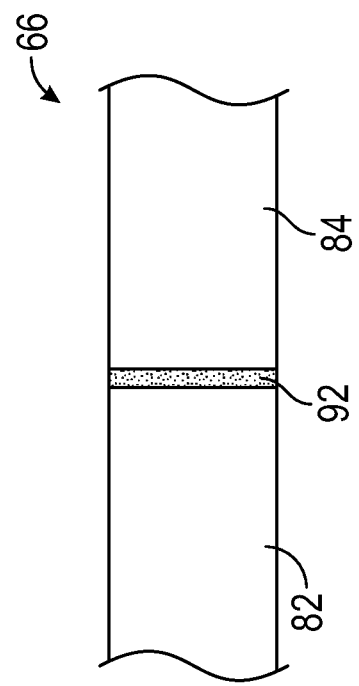
FIGS. 8A and 8B illustrate exemplary features of an outer shell assembly of a battery array.
Figure 7:
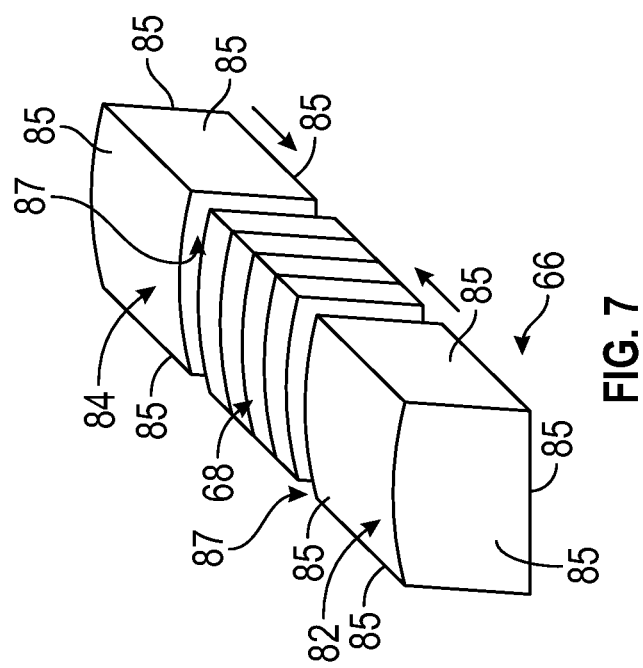
FIG. 7 is an exploded view of the battery array of FIG. 5.
Figure 8A:
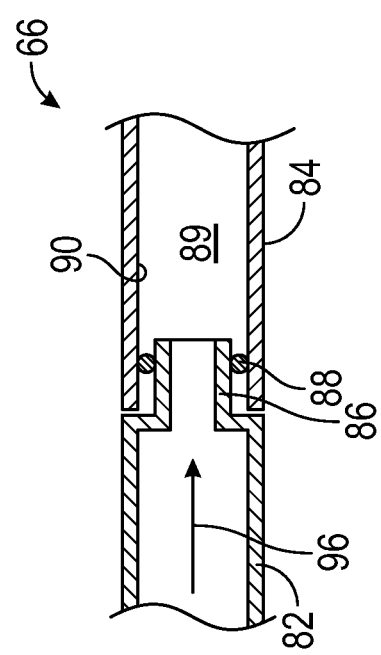

Referring now primarily to FIGS. 7, 8A, and 8B, the outer shell assembly 66 may include a first shell portion 82 and a second shell portion 84 that may be connected together to enclose the battery subassembly 68 inside the outer shell assembly 66. The first and second shell portions 82, 84 may be configured as box shaped structures that include five sides 85 and one open side 87. The open sides 87 of the first and second shell portions 82, 84 may be received together to surround the battery subassembly 68.

In an embodiment, shown in FIG. 8A, the first shell portion 82 may include a flange 86 that is received within an inner cavity 89 of the second shell portion 84. A seal 88, such as a gasket seal, a face seal, a flange seal, etc., may be positioned between the flange 86 and an inner surface 90 of the second shell portion 84. The seal 88 is configured to prevent the non-conductive fluid 96 that is communicated through the interior of the battery array 25 from leaking at an interface between the first and second shell portions 82, 84 and to prevent the ingress of moisture, dust, and other contaminants into the interior of the battery array 25.

In another embodiment, shown in FIG. 8B, the first and second shell portion 82, 84 of the outer shell assembly 66 are joined together at a seam 92. The seam 92 may be established by a weld, an adhesive, or any other joining technique. The seam 92 may function to both adjoin the first and second shell portions 82, 94 and seal the interface therebetween.

The outer shell assembly 66 may be constructed from a polymer-based material. In an embodiment, the polymer-based material of the outer shell assembly 66 is a different polymer-based material than that used to construct the compressible spacer assembly 64. Exemplary polymer-based materials for the outer shell assembly 66 may include, but are not limited to, sheet moulding compounds (e.g., glass-fiber reinforced polyester), polypropylene, and polyamine. In general, the outer shell assembly 66 is made of a more rigid polymer-based material than the compressible spacer assembly 64.

Figure 9:
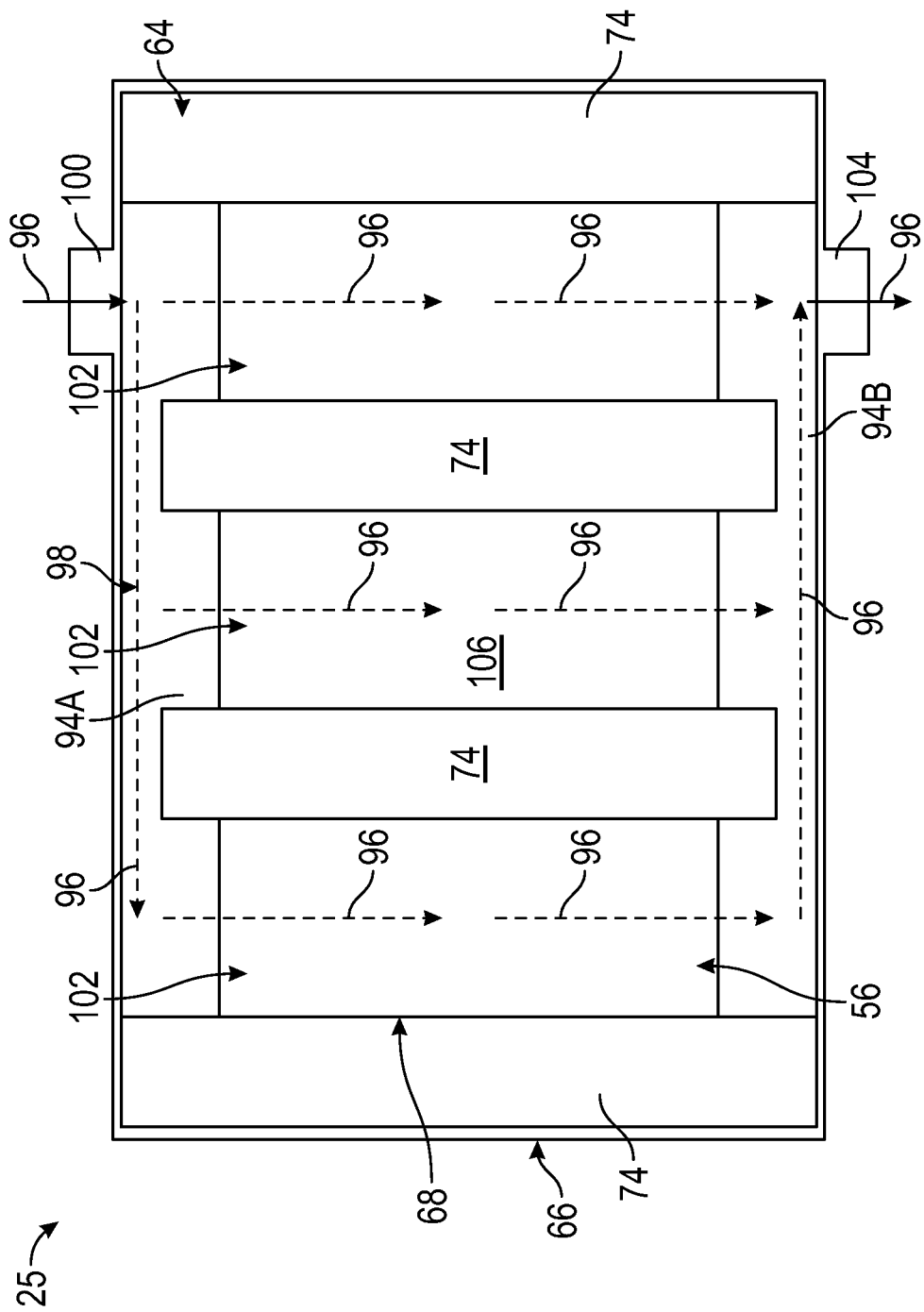
FIG. 9 schematically illustrates an immersion cooling system of a battery array.

FIG. 9, with continued reference to FIGS. 3-5, schematically illustrates an immersion cooling system 98 that may be provided for thermally managing the heat generated by the battery cells 56 of the battery array 25.

The immersion cooling system 98 may include an inlet 100, a first open space 94A above the battery cells 56, a plurality of integrated flow paths 102, a second open space 94B below the battery cell 56, and an outlet 104. Together, the first open space 94A, the plurality of integrated flow paths 102, and the outlet 104 establish a fluid flow pattern for communicating the non-conductive fluid 96 inside the battery array 25. The battery subassembly 68 may be arranged as desired inside the outer shell assembly 66 for configuring the plurality of integrated flow paths 102 and the first and second open spaces 94A, 94B. The battery subassembly 68 may be completely submerged (i.e., immersed) within the non-conductive fluid 96 inside the outer shell assembly 66.

In an embodiment, the integrated flow paths 102 extend between adjacent columns 74 of the compressive spacer assemblies 64. In this way, the non-conductive fluid 96 may flow directly across the faces 106 of the battery cells 56 for achieving a desired cooling effect.

In use, the non-conductive fluid 96 may enter the inlet 100 of the immersion cooling system 98 and then flow to the first open space 94A. The non-conductive fluid 96 may then flow across the faces 106 of the battery cells 56 within the integrated flow paths 102 before entering the second open space 94B. The non-conductive fluid 96 may then exit through the outlet 104 in order to dissipate heat that has been generated by the battery cells 56. The non-conductive fluid 96 exiting through the outlet 104 is generally warmer than the non-conductive fluid 96 that enters the inlet 100. In an embodiment, the outlet 104 is located on an opposite side of the immersion cooling system 98 from the inlet 100.

The non-conductive fluid 96 may be communicated from a coolant source (not shown) that is either part of a main cooling system of an electrified vehicle or a dedicated coolant source of the battery pack 24. Although not shown, the non-conductive fluid 96 may pass through a heat exchanger before being returned to the inlet 100 of the immersion cooling system 98.

In an embodiment, the inlet 100 and the outlet 104 are configured as tubing for receiving and discharging the non-conductive fluid 96 from the battery array 25. The inlet 100 and the outlet 104 may be separate components that are attached to the outer shell assembly 66, or the inlet 100 and the outlet 104 could be integrally formed components of the outer shell assembly 66.

The exemplary battery arrays of this disclosure employ an immersion cooling strategy for thermally managing heat generated by battery cells. Unlike the conductive glycol utilized within known cold plate systems, the non-conductive fluid received inside the immersion cooled battery arrays of this disclosure allows for direct contact with the battery cells and other electrified components without causing electrical shorts, thereby improving cooling and performance. The exemplary immersion cooling strategies further enable high rate charging and discharging and allow for high load demands without increasing the hardware size of the battery arrays.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery array, comprising:
   a first compressible spacer plate;
   a second compressible spacer plate;
   a battery cell received between the first and second compressible spacer plates to establish a battery subassembly; and
   an outer shell assembly enclosing the battery subassembly,
   wherein each of the first compressible spacer plate and the second compressible spacer plate is movable between an uncompressed state and a compressed state relative to the battery cell,
   wherein a column that extends between the first and second compressible spacer plates is spaced apart from the battery cell in the uncompressed state and is positioned against the battery cell in the compressed state.

2. The battery array as recited in claim 1, wherein at least one of the first compressible spacer plate, the second compressible spacer plate, and the column includes a lattice structure having a plurality of interconnected passageways.

* * * * *